(12) United States Patent
Schermacher et al.

(10) Patent No.: US 6,719,452 B2
(45) Date of Patent: Apr. 13, 2004

(54) PROCESS FOR MANUFACTURING TRANSPARENT TINTS

(75) Inventors: Ken Stephen Schermacher, Chadds Ford, PA (US); Allan Blase Joseph Rodrigues, Bloomfield Hills, MI (US); Anthony Joseph Martino, West Chester, PA (US); Douglas E. Spahr, Wilmington, DE (US); Timothy Aaron Snyder, Voorhees, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 24 days.

(21) Appl. No.: 10/097,991

(22) Filed: Mar. 13, 2002

(65) Prior Publication Data

US 2003/0004229 A1 Jan. 2, 2003

Related U.S. Application Data

(60) Provisional application No. 60/276,966, filed on Mar. 19, 2001.

(51) Int. Cl.[7] .............................. G01J 3/46; C09D 11/00
(52) U.S. Cl. ....................... 366/132; 366/134; 366/142; 366/152.1; 366/160.1
(58) Field of Search ................................. 366/132, 134, 366/136, 142, 143, 150.1, 151.1, 152.1, 160.1; 523/303; 700/265

(56) References Cited

U.S. PATENT DOCUMENTS

| 3,425,667 | A | * | 2/1969 | Schutte et al. | ............... 366/132 |
| 3,601,589 | A | * | 8/1971 | McCarty | ..................... 382/165 |
| 4,212,545 | A | * | 7/1980 | Lovasz et al. | ............... 366/132 |
| 4,256,131 | A | * | 3/1981 | De Remigis | .................... 137/3 |
| 4,403,866 | A | | 9/1983 | Falcoff et al. | |
| 4,511,251 | A | | 4/1985 | Falcoff et al. | |
| 4,887,217 | A | | 12/1989 | Sherman et al. | |
| 4,890,920 | A | | 1/1990 | Niziolek et al. | |
| 4,936,685 | A | | 6/1990 | Taylor et al. | |
| 5,023,814 | A | * | 6/1991 | Guillemin | .................... 382/162 |
| 5,590,960 | A | * | 1/1997 | Clinton et al. | ............... 366/134 |
| 6,288,783 | B1 | | 9/2001 | Auad | |
| 6,494,608 | B1 | * | 12/2002 | Retamal et al. | .............. 366/132 |

FOREIGN PATENT DOCUMENTS

| BR | PI9800361-5 | 2/1998 |
| DE | 25 25 701 A1 | 12/1976 |
| DE | 240 075 A1 | 10/1986 |
| FR | 2 594 131 A1 | 8/1987 |
| GB | 1 589 705 | 5/1981 |
| SU | 364877 | 11/1973 |
| WO | WO 99/48602 A1 | 9/1999 |

OTHER PUBLICATIONS

Anonymous, Colour measuring of wet coating composition, Research Disclosure—Nov. 1991, RD 3 3196.
Copy of International Search Report dated Nov. 7, 2002.

* cited by examiner

*Primary Examiner*—Tony G. Soohoo
(74) *Attorney, Agent, or Firm*—Steven C. Benjamin

(57) ABSTRACT

A rapid process for making transparent tints that match the color and tinting strength of a standard tint. The process involves the use of a faster and more accurate shading technique that utilizes the light transmittance properties of the tints in the wet over the visible spectrum and calculates therefrom the amount of components required to bring the tint within an acceptable match to the standard.

9 Claims, 1 Drawing Sheet

PROCESS FOR MANUFACTURING TRANSPARENT TINTS

CROSS-REFERENCE TO RELATED APPLICATION

This application claims priority under 35 U.S.C. §119 from U.S. Provisional Application Ser. No. 60/276,966 (filed Mar. 19, 2001), which is incorporated by reference herein for all purposes as if fully set forth.

BACKGROUND OF THE INVENTION

This invention relates to a rapid process for making transparent tints that match the color and strength of a standard tint, using the light transmittance properties of the tints in the wet to bring them within an acceptable match to the standard.

Transparent tints are widely used nowadays in formulating metallic coating compositions used in particular for exterior finishes for automobiles and trucks. The transparent tints contain pigments with extremely small particle sizes (typically less than 0.4 micron in size) so that they impart the desired color to the coating without detracting from its transparency and clarity. This permits the metallic pigments, e.g., aluminum flake or pearlescent pigments, that are used in combination with the transparent tints, to show through and provide the finish with metallic glamour and maximum flop.

In the manufacture of transparent tints, one problem is to match the color and tinting strength of the tint as it is being made to a standard tint. The standard procedure used nowadays to test and bring the tints within an acceptable match to the standard is a manual process, which involves taking an aliquot of tint, blending it with a standard white paint, spraying the blend onto panels, baking the panels, and then measuring one or more color properties of the dried coating using a spectrophotometer or calorimeter. The color measurements are then compared to sprayouts of a standard batch of that tint blended with the same standard white paint to calculate the quantities of shading colorants and clear binder required to correct the batch for color and strength.

The technique for mixing a highly absorbing transparent tint with a standard white paint is necessary because the absorption of the tint, in its neat state, is so high that small differences in the hue or chroma between two such tints cannot be seen. Blending with white magnifies these differences, so that they are seen more like they would be seen in the final paint. Similarly, little information on tinting strength, which is the ability of a tint to impart its color to a final product, can be obtained without blending with a white standard. Highly scattering tints (e.g., yellows) may be blended with a standard black to determine strength by the tint's ability to lighten the black. Furthermore, if there are hue or chroma or strength differences between the test tint blend and the standard tint blend, then other colorants or clear binder must be added to correct for these differences. Thus, the color values such as L*, a*, b* or L*, c*, h* of the test tint must be matched within acceptable tolerances using the blends rather than neat tints in order to completely control the color and strength of the test tint.

Measuring color and strength and shading the tints by this method, however, is cumbersome and very time consuming because of sample preparation and paint drying time, which causes major delays in the tint manufacturing process. Other problems also arise in that the accuracy of the test is dependent on the color and strength stability of the standard white or black paints. Even with careful control, these standards tend to vary from batch to batch and also tend to flocculate or settle in time, leading to poor test repeatability and difficulty in accurately matching the tint being made to a standard tint. Additionally, there is inherent variability in the dry sample preparation process which also leads to inaccuracy in color determination.

The aim within the industry for some time has been to measure the color and strength properties of tints and shade in the wet state and in a way which predicts the color and strength of the tint when applied and dried. The primary benefits are mainly associated with time savings although some are associated with the increased likelihood of an automated tint manufacturing process.

Yet, wet shading techniques proposed in the past have produced inconsistent results. A number of wet reflectance methods have been proposed for adjusting the color property of fluids to bring them within an acceptable match to the standard. These methods, however, are mainly aimed at opaque paints. In the case of highly absorbent transparent materials, the prior art does not teach how to go about adjusting them unless they are first blended with a standard white or black base and sprayed out and compared in the dry, which still leads to the same inaccuracies as mentioned above.

Falcoff et al. U.S. Pat. No. 4,403,866 issued on Sep. 13, 1983 teaches automatic adjustment of color properties using wet shading techniques, but does not teach how to accomplish this in transmission mode. Auad WO 98/16822 published Apr. 23, 1998 provides an instrument for measuring the color properties of colored bases or tints using wet light transmittance but fails to teach how to shade these bases and tints. A related article by Pfeil, *Tinting Strength Adjustments Using Light Transmission*, Paint and Coatings Industry Journal, April 2000, discusses the advantages of transmittance measurements but does not teach how to color shade using such measurements.

Therefore, there is still a need for a process for making transparent tints that utilizes a faster, more accurate and more consistent wet shading technique by light transmittance, that does not require spraying and blending with white or black standards and the production of dry samples during the manufacturing process, and allows the tints to be shaded for color and strength in a very short period of time, with confidence that the wet readings will lead to an acceptable match with the standard in the dry.

SUMMARY OF THE INVENTION

The invention relates to a rapid process for making a transparent tint that matches the color and tinting strength of a standard tint, which involves the use of an improved wet shading technique that measures the light transmittance of the tint in the wet over the visible spectrum and quickly determines therefrom with precision the amount of components of the tint which must be added to bring the tint within an acceptable color and strength tolerance which provides a good wet and dry match to the standard. The process of this invention is particularly useful in the production of transparent tints for high performance metallic coatings for automobile and truck exteriors, but can also find use in the manufacture of other paints, printing inks, ink jet inks and other colored products using transparent tints.

The process for manufacturing transparent tints involves the following:

(a) charging the components of a transparent tint such as clear polymer binder for the tint, solvent for the tint, and colorant in the form of a pigment dispersion, transparent tint or dye solution in a mixing vessel;

(b) mixing the components to form a liquid tint;

(c) shading the tint during its manufacture by passing the liquid tint through a controlled-pathlength transmittance cell coupled to a spectrophotometer;

(d) measuring the light transmittance of the liquid tint over the visible spectrum;

(e) calculating the color values such as L*, a*, b* or other color values of the wet tint being manufactured from the light transmittance measurements;

(f) comparing the color values of the wet tint being manufactured to the color values of the standard wet tint and calculating the difference between the values of the tint being manufactured and the standard tint and calculating the quantity of components to be added to the tint to bring the tint within specified color tolerance values for the tint;

(g) adding to the tint being manufactured the quantities of components calculated in step (f);

(h) repeating steps (b)–(f) at least once in the event the tint is not within the specified color and strength tolerance until the tint being manufactured is within said tolerance.

In a preferred embodiment, the process might also comprise:

(i) adjusting the pathlength of the transmittance cell so that it is the same when measuring the light transmittance of the tint being made as it was when measuring the standard tint.

In another embodiment, the process may further comprises:

(j) measuring the light transmittance in direct transmittance mode for tints without scattering pigments, and utilizing diffuse transmittance for tints containing scattering pigments.

In another preferred embodiment, the invention utilizes a computer to perform the necessary calculations. In yet another embodiment, the invention provides an automated computer controlled batch or continuous process for the manufacture of transparent tints that utilizes on-line testing of the tints.

DETAILED DESCRIPTION OF THE INVENTION

Figure 1:
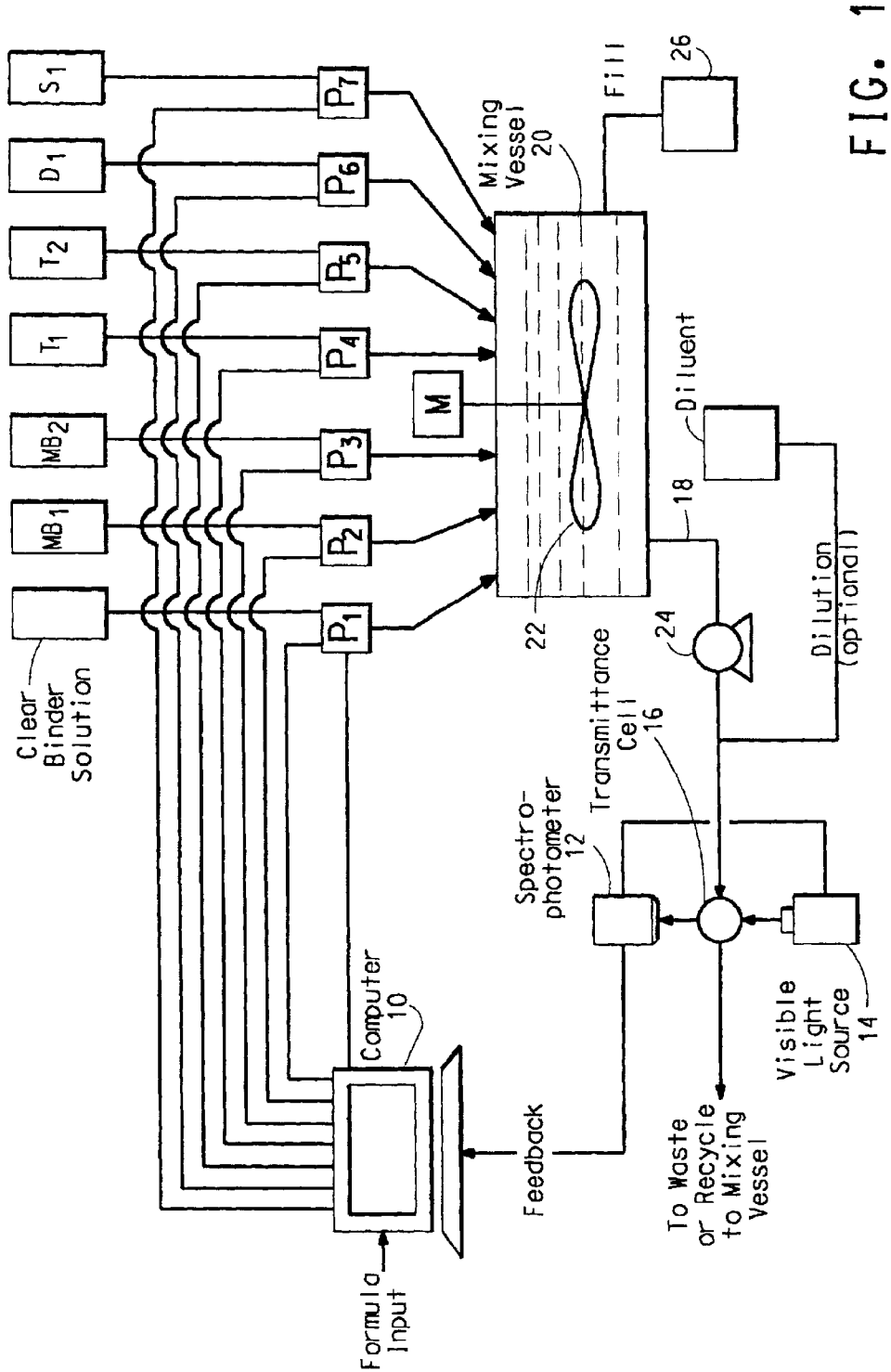
FIG. 1 shows a schematic diagram of the process of the invention used to make transparent tints that match a standard tint within acceptable tolerances, and also demonstrates the possibility of having an on-line color and strength measuring and shading system.

The process of this invention produces a transparent tint having a color and tinting strength that accurately matches the color and strength of a standard liquid tint through the use of wet spectral transmittance readings of the tint over the visible spectrum with confidence that the wet readings will lead to a good match in the dry. This makes the transparent tint preparation process faster and more accurate, significantly reduces the time it takes to analyze and adjust the tint properties, and eliminates the need for spraying and blending with standard white or black bases as well as the preparation of dry samples during the manufacturing process. It also enables on-line testing of the tints and automated tint manufacture in batch or continuous mode.

The high quality transparent tints produced by the process of this invention are particularly useful in formulating high performance coating compositions and in particular metallic colorcoat or basecoat compositions for clearcoat/colorcoat finishes for automobile and truck exteriors.

In the preferred process of this invention, a computer is used to facilitate the required calculations. Although less preferred, calculations can also be done by hand. In addition, the spectrophotometer can be any commercially available unit capable of measuring spectral transmittance over the visible spectrum of the wet tint being manufactured and generating spectral transmittance curves and L*, a* and b* or other suitable color values therefrom.

In the process of this invention, the optical pathlength of the transmittance cell is set low enough to allow sufficient light throughput to be accurately measured by the detectors, yet high enough to avoid saturation of the detectors. Pathlengths are typically set between 10–250 microns, preferably 20–75 microns. However, for some optically dense tints, dilution may be necessary to obtain full spectral information. Temperature of the measurement cell and the liquid within the cell are held to a narrow enough range such that thermal expansion does not change the effective pathlength and such that the standard and sample readings are comparable. The liquid standard and test sample are measured at the same pathlength and in the same temperature range to insure uniform comparisons. The data for the liquid standard can optionally be retrieved from stored data from previous measurements. Transmittance measurements are carried out in either direct transmittance mode or diffuse transmittance mode, depending on the level of scattering in the tint components.

Referring now to FIG. 1, when the process of this invention involves the use of a computer 10, the formula of the tint being manufactured describing the amount of colorants, binders, solvents and other additives required to make a certain volume of a batch of tint is fed into the computer. The L*, a* and b* for the standard liquid tint and the permissible L*, a*, b* color values such as color tolerance values (i.e., the allowable variation from standard in each of these three dimensions) at a specified pathlength for the tint being made are also fed into the computer. Matching these L*, a*, b* values of the standard within these tolerances assures a match in Lightness, Chroma and Hue, thus matching both color and strength. If the color vector values of the colorant solutions or dispersions used to formulate the tint are known, these values are also fed into the computer so that the computer can calculate the amount of colorant required to bring the paint within color tolerance. If the color vector values of the colorants are unknown, the color vector values of each colorant are generated by the computer by measuring the L*, a*, b* values of a tint before and after an addition of a known amount of colorant and determining the change in L*, a*, b* values resulting from the addition.

The color shading technology used in the process is well known and is fully discussed in Falcoff et al. U.S. Pat. No. 4,403,866, issued Sep. 13, 1983, hereby incorporated by reference.

The spectrophotometer 12, which is coupled to a visible light source 14, and transmittance cell 16 utilized in the process are either positioned at a remote location from the mixing vessel for off-line testing or, as shown in FIG. 1, connected via fluid line 18 to the mixing vessel 20 for on-line testing of the wet tint. In the preferred process of the invention, the wet tint is simply transferred directly to a transmittance cell coupled to the spectrophotometer for spectral measurement. Allowing the tint to flow through the cell directly from the mixing vessel allows for on-line and continuous tint testing and enables automated tint manufacture in a batch or continuous mode.

In the process of this invention, the components used to make the transparent tint, i.e., colorant in the form of a pigment dispersion ($MB_1$, $MB_2$) or dye solution ($D_1$), clear binder ($CB_1$) for the tint, solvent ($S_1$) and optional other additives such as tinting solutions ($T_1$, $T_2$), are preferably metered into a mixing vessel 20 containing a mixer 22 having a mixing head attached to a shaft and driven by a motor. The mixing vessel can be any commercially available unit that is capable of achieving the necessary homogenization of the components. In cases where the tint or colorants are prone to flocculation, a high shear mixer is preferred. It is also preferred to use a mixer and metering equipment that are controlled by the computer.

The components are then thoroughly blended together to form a liquid tint composition. The liquid tint is then passed via fluid line 18 and pump 24, through a transmittance cell 16 which is coupled to the spectrophotometer 12 for measurement. The cell has a viewing window which is transparent to the visible light spectrum and usually is made of quartz or sapphire glass. In the preferred process of this invention, tint flow through the cell is set sufficiently high to provide a constant interface that can be measured by the spectrophotometer and to prevent build-up of deposits on the cell windows. This improves the measurement accuracy and also retards settling or flocculation of the pigments in the tint. In some cases, where deposits on the glass interface and settling of the pigments are not of concern, transmittance can be advantageously measured in a static sample without flow.

Optionally, prior to the wet transmittance readings, neat samples of the batch that have been extracted from the mixing vessel might have to be diluted with a diluent such as clear binder/solvent blend to achieve desired lightness and spectral information.

The spectrophotometer 12 used in the process is electrically connected to the computer 10 and preferably measures the transmittance of the wet tint being prepared over the visible spectrum, calculates $L^*$, $a^*$, $b^*$ or other suitable color values from the spectral transmittance curve, and feeds this data back to the computer. Typically the spectrophotometer will take spectral transmittance measurements and determine the spectral curve of the tint through the visible spectrum of 400–700 nanometers (nm) at 10 nm increments.

The computer takes these $L^*$, $a^*$ and $b^*$ values and determines the difference between the $L^*$, $a^*$, $b^*$ values of the tint being prepared and tolerance values for the standard tint ($\Delta L^*$, $\Delta a^*$, $\Delta b^*$). With the color vector information of the colorants and the $\Delta L^*$, $\Delta a^*$, $\Delta b^*$, the computer determines the amounts of clear binder and colorants to be added to bring the batch within the desired tolerances. These same computations can also be done with the tolerances and vectors specified in $\Delta L^*$, $\Delta c^*$ and $\Delta h^*$ which give a more direct indication of lightness, chroma and hue. The units are a mathematical transformation from $L^*$, $a^*$ and $b^*$. Addition of the calculated amount of components to the batch may be made manually or automatically. After the addition and mixing of the prescribed quantities of components, the above spectral transmittance measurements and calculations are again made and if the color and strength fall outside of the tolerance values, the process is repeated until the tint being prepared is within the desired tolerances.

After the tint is prepared to meet the required color and strength tolerance, it can be filled into suitable containers 26 either automatically or manually using conventional filling equipment and procedures.

If desired, the entire tint manufacturing process can be controlled by a computer as shown in FIG. 1. If the computer is electrically connected to the mixer, to the metering pumps which control the supply of a component used in the tint, and to the spectrophotometer, the computer can initiate the addition of accurately measured amounts of each component based on the spectrophotometric readings and resultant calculations. The computer can also halt the mixer and automatically dispense the tint from the mixing vessel after the tint is prepared.

The process of this invention is particularly useful in the production of transparent tints for high performance metallic coatings for automobile and truck exteriors, but can also find use in the manufacture of other paints, printing inks, ink jet inks and other colored products using transparent tints.

A variation of this invention, although less desired, is to use the same process with spectral transmittance measurements on precision coatings, drawdowns or sprayouts of the tints over a transparent substrate such as Mylar® film.

The following Examples illustrate the invention.

EXAMPLES

Example 1

The process described above was operated in off-line mode to convert a batch of single-pigment green dispersion to its corresponding green tint. Optical pathlength was set at 38 microns. Prior to wet transmittance readings, neat samples of the batch being converted were diluted with 3 parts of a clear acrylic binder/solvent blend to 1 part of sample to achieve desired lightness and spectral information.

Dry color values for the standard green tint were established using the traditional process of mixing with white, spraying onto panels, baking the panels and measuring the reflected color of the dry panels. Wet color values for the standard were established using wet transmittance at the same pathlength and dilution as the test batch. These values were recorded:

| | | | |
|---|---|---|---|
| Standard Tint - Wet | $L^* = 78.99$ | $A^* = -65.61$ | $b^* = 35.05$ |
| Standard Tint - Dry | $L^* = 63.11$ | $a^* = -53.21$ | $b^* = 17.85$ |

Tolerance values for $L^*$, $a^*$ and $b^*$ for this tint are +/−0.3.

As a first step, color vector values for the tint shading components were established by adding known amounts of the components to the standard tint and measuring the resulting color differences in wet transmittance. Results are as follows:

| | Amount Added (grams/100 grams of tint) | $L^*$ | $a^*$ | $b^*$ |
|---|---|---|---|---|
| Clear Binder | 20.00 | 2.84 | 4.26 | −3.88 |
| Transoxide Yellow | 6.00 | −0.63 | 2.87 | 1.68 |
| Light Blue | 1.00 | −0.65 | −1.16 | −1.31 |

These color vector values and the values for the standard tint were fed into the computer to be used for subsequent calculations to determine the quantities of components to be added to the test dispersion batch.

Initial wet color values of the test dispersion were measured as follows:

| | | | |
|---|---|---|---|
| Absolute Values | L* = 78.70 | a* = −70.09 | b* = 36.00 |
| Δ's versus Standard | L* = −0.29 | a* = −4.48 | b* = 0.95 |

Based on the above differences and the above color vector values, the computer calculated the amounts of components to be added to the dispersion to bring it into a wet match and the standard. The following amounts were added manually to the batch:

| | |
|---|---|
| Clear Binder | 7.505 grams/100 grams of dispersion |
| Transoxide Yellow | 4.985 grams/100 grams of dispersion |
| Light Blue | 0.350 grams/100 grams of dispersion |

After thorough mixing, the batch was sampled and measured in wet transmittance with the following results:

| | | | |
|---|---|---|---|
| Absolute Values | L* = 78.71 | a* = −65.51 | b* = 34.93 |
| Δ's versus Standard | L* = −0.28 | a* = 0.10 | b* = −0.12 |

These values are within the aforementioned tolerance values for L*, a* and b*.

A sample of the resulting tint was then tested in the traditional manner to check dry color values, with the following results:

| | | | |
|---|---|---|---|
| Absolute Values | L* = 62.86 | a* = −53.19 | b* = 17.65 |
| Δ's versus Standard | L* = −0.25 | a* = 0.02 | b* = −0.19 |

The dry values are within the tolerance values, indicating that an acceptable tint was produced. Additionally, the wet differences in color and strength between batch and standard matched those in the dry extremely well.

What is claimed is:

1. A process for making a transparent tint which comprises
   (a) charging the components of a transparent tint, said components comprising a clear polymeric binder for the tint, solvent for the tint, and colorant in a mixing vessel;
   (b) blending the components to form a liquid tint composition;
   (c) shading the tint during its manufacture by passing the liquid tint through a controlled pathlength transmittance cell coupled to a spectrophotometer;
   (d) measuring the spectral transmittance of the liquid tint over the visible spectrum;
   (e) calculating the color values of the wet tint being manufactured from the light transmittance measurements;
   (f) comparing the color values of the wet tint being manufactured to the color values of the standard wet tint and calculating the difference between the values of the tint being manufactured and the standard tint and calculating the quantity of colorants to be added to the tint to bring the tint within specified color and strength tolerance values;
   (g) adding to the tint being manufactured the quantities of components calculated in step (f);
   (h) repeating steps (b)–(f) at least once in the event the tint is not within the specified color and strength tolerance until the tint being manufactured is within said tolerance.

2. The process of claim 1, in which step (c) the liquid tint is fed directly from the mixing vessel to the transmittance cell.

3. The process of claim 1 in which the calculations are computer-controlled.

4. The process of claim 3 in which the process is automated.

5. The process of claim 4 in which the process is continuous.

6. Use of a tint prepared by the process of claim 1 in a paint.

7. Use of a tint prepared by the process of claim 1 in an ink jet ink.

8. The process of claim 1, in which:
   (i) the pathlength of the transmittance cell is adjusted so that it is the same when measuring the light transmittance of the tint being made as it was when measuring the standard tint.

9. The process of claim 1, in which:
   (j) direct transmittance sample measurements are employed for tints without scattering pigments, while diffuse transmittance measurements are utilized for tints containing scattering pigments.

* * * * *